United States Patent
Stauffer

(10) Patent No.: US 9,147,912 B2
(45) Date of Patent: Sep. 29, 2015

(54) METHOD OF PRODUCING AN ELECTRICAL POTENTIAL

(71) Applicant: John E. Stauffer, Greenwich, CT (US)

(72) Inventor: John E. Stauffer, Greenwich, CT (US)

(*) Notice: Subject to any disclaimer, the term of this patent is extended or adjusted under 35 U.S.C. 154(b) by 0 days.

(21) Appl. No.: 14/267,202

(22) Filed: May 1, 2014

(65) Prior Publication Data

US 2014/0239902 A1 Aug. 28, 2014

Related U.S. Application Data

(63) Continuation of application No. 13/901,157, filed on May 23, 2013, now abandoned, which is a continuation-in-part of application No. 13/649,602, filed on Oct. 11, 2012, now abandoned, which is a continuation-in-part of application No. 12/608,201, filed on Oct. 29, 2009, now abandoned, which is a continuation-in-part of application No. 11/249,223, filed on Oct. 13, 2005, now abandoned, which is a continuation of application No. 10/756,015, filed on Jan. 13, 2004, now abandoned.

(51) Int. Cl.

| | |
|---|---|
| *H01M 10/44* | (2006.01) |
| *H01M 10/22* | (2006.01) |
| *H01M 10/26* | (2006.01) |
| *H01M 10/06* | (2006.01) |
| *H01M 8/18* | (2006.01) |
| *H01M 4/24* | (2006.01) |

(52) U.S. Cl.
CPC .............. *H01M 10/44* (2013.01); *H01M 4/244* (2013.01); *H01M 8/186* (2013.01); *H01M 10/06* (2013.01); *H01M 10/22* (2013.01); *H01M 10/26* (2013.01)

(58) Field of Classification Search
CPC ...................................................... H01M 10/44
USPC .................. 429/201, 225, 228, 347
See application file for complete search history.

(56) References Cited

U.S. PATENT DOCUMENTS

| | | | | |
|---|---|---|---|---|
| 1,454,943 | A | * | 5/1923 | Pepper .......................... 429/164 |
| 1,955,115 | A | | 4/1934 | Drumm |
| 3,009,007 | A | | 11/1961 | Bryant, Jr. |
| 3,466,194 | A | | 9/1969 | Duddy |
| 3,833,427 | A | | 9/1974 | Land et al. |
| 3,862,261 | A | * | 1/1975 | Stoddard ....................... 428/412 |
| 3,862,861 | A | | 1/1975 | McClelland et al. |
| 4,076,909 | A | * | 2/1978 | Lindstrom .................... 429/207 |
| 4,268,589 | A | | 5/1981 | Tamminen |
| 4,830,718 | A | | 5/1989 | Stauffer |

(Continued)

FOREIGN PATENT DOCUMENTS

JP     358001966    *   7/1983

OTHER PUBLICATIONS

JP358001966 (Abstract).*

*Primary Examiner* — Patrick Ryan
*Assistant Examiner* — Alex Usyatinsky
(74) *Attorney, Agent, or Firm* — Young Basile Hanlon & MacFarlane P.C.

(57) ABSTRACT

A method of producing an electrical potential by way of a rechargeable battery with a positive electrode of lead and a negative electrode of highly pure zinc. The electrolyte is an aqueous solution of an alkali metal bisulfate. Upon discharge, lead dioxide is reduced to lead sulfate, zinc is oxidized to zinc oxide, and the electrolyte is converted to an alkali metal hydroxide. The reactions are reversed when the battery is charged.

3 Claims, 1 Drawing Sheet

(56) References Cited

U.S. PATENT DOCUMENTS

| | | |
|---|---|---|
| 5,344,528 A | 9/1994 | Bossler et al. |
| 5,512,144 A | 4/1996 | Stauffer |
| 5,599,637 A | 2/1997 | Pecherer |
| 5,641,591 A * | 6/1997 | Kawakami et al. ........ 429/231.5 |
| 5,705,050 A | 1/1998 | Sampson |
| 6,010,604 A | 1/2000 | Stauffer |
| 6,183,914 B1 | 2/2001 | Yao et al. |
| 6,235,167 B1 | 5/2001 | Stauffer |
| 6,787,265 B2 | 9/2004 | Phillips |
| 2007/0111096 A1 * | 5/2007 | Kobayashi et al. ........... 429/229 |
| 2007/0134553 A1 * | 6/2007 | Kobayashi et al. ........... 429/229 |
| 2007/0190410 A1 * | 8/2007 | Kobayashi et al. ........... 429/164 |

* cited by examiner

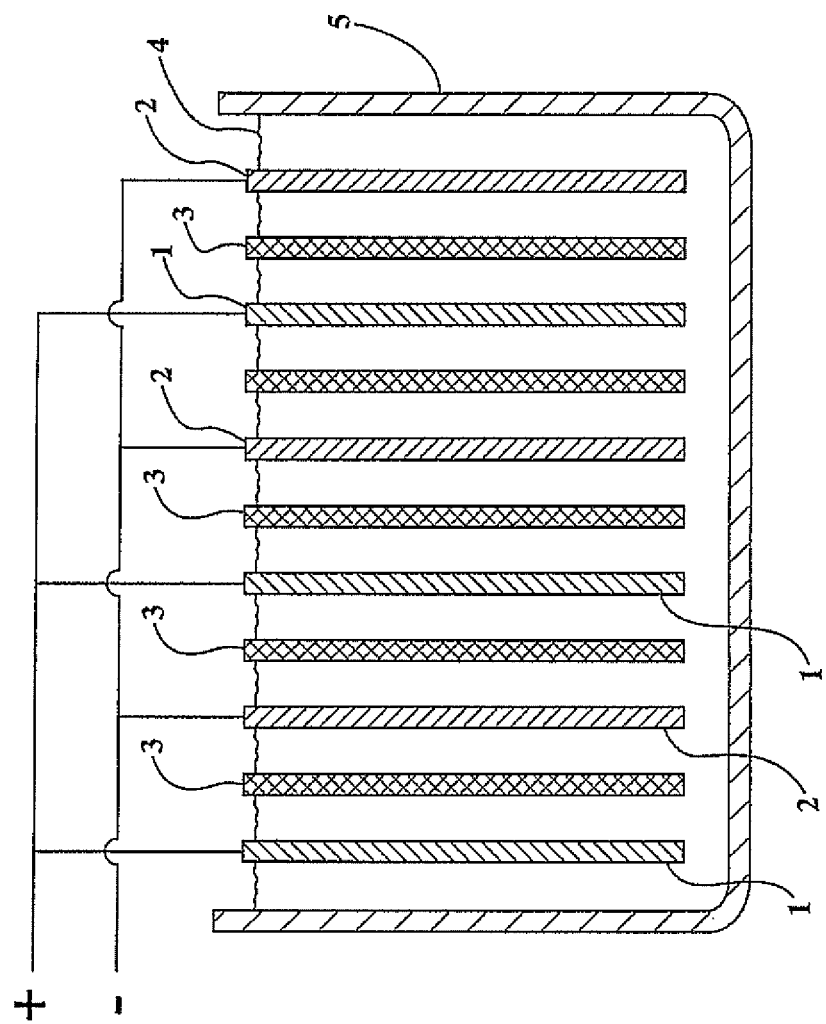

METHOD OF PRODUCING AN ELECTRICAL POTENTIAL

RELATED APPLICATIONS

This application is a continuation of U.S. application Ser. No. 13/901,157 filed on May 23, 2013, which is a continuation-in-part of U.S. application Ser. No. 13/649,602 filed on Oct. 11, 2012, which is a continuation-in-part of U.S. application Ser. No. 12/608,201 filed on Oct. 29, 2009 currently pending, which is a continuation-in-part of U.S. application Ser. No. 11/249,223 filed on Oct. 13, 2005 and abandoned, which in turn is a continuation of U.S. application Ser. No. 10/756,015 filed on Jan. 13, 2004 and abandoned. In addition, this application is a continuation-in-part of U.S. patent application Ser. No. 11/167,535 filed on Jun. 27, 2005, now U.S. Pat. No. 7,947,391, which is a continuation-in-part of U.S. patent application Ser. No. 10/756,015 filed on Jan. 13, 2004 and abandoned.

FIELD OF THE INVENTION

The present invention relates to a novel type of storage battery which is distinguished by its unique electrochemistry. The positive electrode comprises, in the charged state, lead dioxide and the negative electrode highly pure zinc. The electrolyte consists of an aqueous solution of an alkali metal bisulfate salt. Various buffering agents, including borates, silicates, and phosphates, may be added to the electrolyte. Upon discharge the lead dioxide is reduced to a divalent lead compound and zinc is oxidized to zinc oxide, and the electrolyte is converted to an alkali metal hydroxide.

BACKGROUND OF THE INVENTION

The most common storage battery, found in almost every vehicle, is the lead-acid battery. This battery comprises a lead dioxide positive electrode, a lead metal negative electrode, and sulfuric acid for the electrolyte. Its chief advantage is low cost. Nevertheless, it has limited energy density and the electrolyte is extremely corrosive. Furthermore, sufficient acid is required to react with the electrodes during discharge. Maintenance-free types avoid the loss of evolved gases, as disclosed in U.S. Pat. No. 3,862,861, but their cycle-life is still restricted.

The search for alternatives to the lead-acid battery has been ongoing. As far back as 1934, Drumm disclosed the nickel oxide-zinc battery and the silver oxide-zinc battery. (U.S. Pat. No. 1,955,115) Both of these batteries employ zinc as the negative electrode and caustic potash as the electrolyte. Nickel oxide or silver oxide serves as the positive electrode. These batteries have improved energy densities and for many uses are a good compromise.

The ideal storage battery would combine the best features of existing batteries with none of the drawbacks. The need for such a battery is apparent for backup power systems and in mobile applications. Therefore, it is an object of the present invention to provide an improved storage battery, one that is both economical and highly efficient. These and other objects, features, and advantages of the invention will be recognized from the following description and the accompanying FIGURE.

SUMMARY OF THE DISCLOSURE

A storage battery is fabricated from a positive electrode of lead and a negative electrode of highly pure zinc. During charging, some lead is converted to lead dioxide. Upon discharge, lead dioxide is reduced to a divalent lead compound, more particularly, lead sulfate. Zinc is oxidized to zinc oxide. These reactions are reversible such that the battery fulfills both functions of a secondary battery: supplying electricity on demand and storing or accumulating surplus electricity.

The electrolyte of the cell is an aqueous solution of a salt selected from the group of alkali metal bisulfates. The alkali metals include lithium, sodium, potassium, rubidium, and cesium. Any combination of these metals may be used. Upon discharge, the electrolyte is converted to an alkali metal hydroxide.

Certain additives have been found to be effective buffers in the electrolyte. These additives include borates, silicates, and phosphates.

The electrodes of a practical embodiment of the invention may be configured as sheets, fibers, or particles, thereby to maximize the electrode surface area. Interspersed particles of a carbonaceous material may be used to improve the electrical conductivity. A gelling agent may be added to immobilize the electrolyte. As required, a separator may be employed between the positive and negative electrodes to prevent a short circuit.

BRIEF DESCRIPTION OF THE DRAWING

FIG. 1 is a rendering of a prototype of a lead-zinc battery according to the present invention, illustrating the principal components of the cell.

WRITTEN DESCRIPTION

The chemistry of the lead-zinc battery is important in order to gain an understanding of its operation. A positive electrode comprises lead dioxide, which is reduced to divalent lead sulfate during discharge. The negative electrode comprises zinc, which is oxidized to zinc oxide when the cell is discharged. The electrolyte is an aqueous solution of an alkali metal bisulfate. In the special case where the alkali metal is sodium, the electrode reactions during discharge can be represented by the following equations.

Positive Electrode:

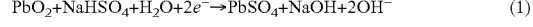
$$PbO_2 + NaHSO_4 + H_2O + 2e^- \rightarrow PbSO_4 + NaOH + 2OH^- \quad (1)$$

Negative Electrode:

$$Zn + 2OH^- \rightarrow ZnO + H_2O + 2e^- \quad (2)$$

When these equations are combined, the overall reaction for the cell is obtained as follows:

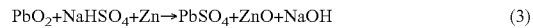
$$PbO_2 + NaHSO_4 + Zn \rightarrow PbSO_4 + ZnO + NaOH \quad (3)$$

During recharging of the cell, the reactions are reversed. Thus, lead sulfate is oxidized to lead dioxide and zinc oxide is reduced to zinc metal. The emf necessary for charging is supplied by an external power source. The discharge-recharge cycle can be repeated endlessly, thus fulfilling the function of a storage battery.

A particularly difficult challenge in designing new batteries is identifying electrode materials that will undergo electrochemical reactions and still withstand corrosion by the electrolyte. Although theory is helpful in this respect, empirical data are required to prove the effectiveness of materials—both for the electrodes and the electrolyte. One measure of the relative performance of a cell is the open-circuit voltage.

In its choice of electrolyte, the present invention has a decided advantage over the prior art. Instead of using an electrolyte comprising a strong alkali like potassium hydroxide or a strong acid like sulfuric acid, the present invention employs an aqueous solution of an alkali metal bisulfate salt. Such an electrolyte is a good ionic conductor but is relatively mild under operating conditions. It therefore avoids problems of electrode corrosion that plague existing batteries.

Notwithstanding the superior performance of the electrolyte of the present invention, there may be a need for better control over the pH of the solution. In this case, a buffering agent may be added to the electrolyte. Such compounds as borates, silicates, and phosphates can be effective in this application. These salts have the added benefit of forming insoluble compounds with the lead and zinc.

The selection of the alkali metal bisulfate for use in the electrolyte is of interest. In aqueous solutions, sulfuric acid is a strong acid but only for the dissociation of one proton. Thus, a solution of alkali metal bisulfate is acidic but to a lesser extent. Such a solution contains alkali metal ions and bisulfate ions. Solutions of alkali metal sulfates are essentially neutral.

The electrolyte environment is important for the electrodes. The positive lead electrode is stable because of the insolubility of lead sulfate. On the other hand, the relatively high electrode potential of zinc indicates that that this metal should dissolve in acids. In fact, that is the case with ordinary zinc that contains impurities. However, pure zinc resists corrosion because of an effect known as over-voltage. Thus, the present invention contemplates the use of high quality zinc in excess of 99.9% for the negative electrode.

The selection of the alkali metal bisulfate for use in the electrolyte is also of interest. Bisulfates of any one of the alkali metals can be used including lithium, sodium, potassium, rubidium, and cesium. As one progresses from lithium to cesium in this series, the electronegativity decreases. This phenomenon will affect the ionic nature of the salts, and therefore can be expected to influence the battery's performance.

Another factor in considering the choice of alkali metal is the solubility of its bisulfate. For example, the solubility of potassium bisulfate at 0° C. is 36.3 gm. per 100 ml. water, whereas the solubility of sodium bisulfate at the same temperature is 50 gm. Greater solubility has an advantage by aiding the compactness of the battery.

The configuration of a lead-zinc cell of the present invention is not restricted. The distinctive features, however, can be appreciated from a drawing of a prototype as shown in FIG. 1. The cutaway perspective shows the electrodes arranged as flat parallel plates. The lead positive electrodes 1 and the zinc negative electrodes 2 are kept apart by separators 3. These parts are immersed in the electrolyte 4, which is contained in casing 5. This sectional view also shows the electrical leads attached to the electrodes.

EXAMPLES (1) A glass jar 4.5 in. high was used for the cell. A plastic divider was used as a separator to kept the electrodes apart. The positive electrode was a strip of lead 1.5 in. wide by 5 in. high. The negative electrode was a sheet of zinc 1.75 in. wide by 3.5 in. long, which had been recovered from a dry cell. The electrolyte was prepared by dissolving 48.1 gm. of sodium bisulfate monohydrate, reagent grade in 200 ml. water. After charging the cell for 8 minutes at 3.0 volts, an open circuit potential of 2.65 volts was observed. The cell was discharged, producing a current of 100 milliamps through a flashlight bulb. After repeated cycling, the electrodes showed no corrosion.

(2) The same cell as used in example (1) was employed except the negative electrode comprised a rod of zinc 99.9999 percent (metals basic) pure. The electrolyte was formulated by dissolving 33.0 gm. of potassium bisulfate, 97% in 200 ml. of water. After charging the cell for 11 minutes at 3.0 volts, an open circuit potential of 2.6 volts was observed. At the end of the run, the zinc rod appeared slightly tarnished but otherwise in excellent condition. The lead electrode was also in perfect condition.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of producing a usable electric potential by way of a storage battery having both positive and negative electrodes and an electrolyte wherein the composition of the positive electrode is lead dioxide, the composition of the negative electrode is uncoated zinc in excess of 99.9% pure and the composition of the electrolyte is an aqueous solution of an alkali metal bisulfate, wherein the method comprises the step of discharging the battery such that the positive electrode is reduced to divalent lead sulfate, the negative electrode is oxidized and the electrolyte is concerted to an alkali metal hydroxide wherein the discharge reaction is represented by the formula:

$$PbO_2 + NaHSO_4 + Zn \rightarrow PbSO_4 + ZnO + NaOH.$$

2. The method of claim 1 further including the step of placing in the electrolyte a buffering agent selected from the group consisting of borates, silicates and phosphates.

3. The method of claim 2 further including the step of providing a separator by placing sheets of material in the electrolyte and between the electrodes.

* * * * *